US010311501B1

(12) United States Patent
Rodoni (10) Patent No.: US 10,311,501 B1
(45) Date of Patent: Jun. 4, 2019

(54) RECYCLING APP FOR CROWD-SOURCED RECYCLING

(71) Applicant: Rubicon Global Holdings, LLC, Atlanta, GA (US)

(72) Inventor: Philip Rodoni, Decatur, GA (US)

(73) Assignee: Rubicon Global, LLC, Atlanta, GA (US)

( * ) Notice: Subject to any disclaimer, the term of this patent is extended or adjusted under 35 U.S.C. 154(b) by 0 days.

(21) Appl. No.: 15/700,070

(22) Filed: Sep. 8, 2017

(51) Int. Cl.
G06Q 30/00 (2012.01)
G06Q 30/06 (2012.01)
G06Q 50/26 (2012.01)
G06K 9/00 (2006.01)

(52) U.S. Cl.
CPC ..... *G06Q 30/0639* (2013.01); *G06K 9/00671* (2013.01); *G06Q 30/0613* (2013.01); *G06Q 30/0643* (2013.01); *G06Q 50/26* (2013.01); *G06Q 30/0605* (2013.01)

(58) Field of Classification Search
CPC .......... G06Q 30/0601; G06Q 30/0641; G06Q 30/0605
USPC ..................... 705/26.1, 27.1, 26.2
See application file for complete search history.

(56) References Cited

U.S. PATENT DOCUMENTS

2011/0279227 A1* 11/2011 Maruca ................. B65F 1/1484
340/5.61
2017/0011363 A1* 1/2017 Whitman ............. B65D 21/086

OTHER PUBLICATIONS

Rogers, Andrew. We've bin watching rubbish. May 15, 2017. News Limited. p. 1 (Year: 2017).*
Garbage disposal soon to go hi-tech. Oct. 3, 2012. HT Media Ltd. (Year: 2012).*

* cited by examiner

*Primary Examiner* — Brittany N Miller
(74) *Attorney, Agent, or Firm* — Rock IP, PLLC (57) ABSTRACT

A system is provided for use in managing waste services performed by a service vehicle. The system may include a sensor configured to capture during completion of a waste service activity an image of waste set out for retrieval by the service vehicle, a portal, and a processor in communication with the sensor and the portal. The processor may be configured to execute instructions stored in memory to receive from a consumer via the portal at least one of a picture and a description of a desired item, to recognize an object in the image captured by the sensor, to make a determination regarding matching of the object with the desired item, and to selectively cause a notification to be displayed on the portal based on the determination.

19 Claims, 4 Drawing Sheets

RECYCLING APP FOR CROWD-SOURCED RECYCLING

TECHNICAL FIELD

The present disclosure relates generally to an app (i.e., a downloadable self-contained software application) for use on a mobile device. More particularly, the present disclosure relates to a system and method for providing a recycling app that can be used to coordinate crowd-sourced recycling.

BACKGROUND

Conventional waste service providers typically dispatch service vehicles to customer properties according to a predetermined pickup schedule. Each service vehicle is tasked with picking up waste that has been left out by different customers in their assigned route. After completing service at a first customer property, the service vehicle is then maneuvered to a next customer property for completion of additional waste services.

Although conventional waste services may satisfy many consumer needs, there may be times when the waste picked up from one customer location includes an item that could be reused by another customer or by a general member of the public. Unfortunately, information about the item is never made available to anyone and the item is disposed of along with the rest of the waste. This can lead to higher disposal costs and have a negative impact on the environment.

The disclosed system, method, and app are directed to overcoming one or more of the problems set forth above and/or other problems of the prior art.

SUMMARY

In one aspect, the present disclosure is directed to a system for managing waste services performed by a service vehicle. The system may include a sensor configured to capture, during completion of a waste service activity by the service vehicle, an image of waste set out for retrieval by a consumer, a portal, and a processor in communication with the sensor and the portal. The processor may be configured to execute instructions stored in memory to receive from the consumer via the portal at least one of a picture and a description of a desired item, to recognize an object in the image captured by the sensor, to make a determination regarding matching of the object with the desired item, and to selectively cause a notification to be displayed on the portal based on the determination.

In another aspect, the present disclosure is directed to a computer-implemented method for managing waste services performed by a service vehicle. The method may include capturing, during completion of a waste service activity by the service vehicle, an image of waste set out for retrieval by a consumer. The method may also include receiving from the consumer at least one of a picture and a description of a desired item, recognizing an object in the image, making a determination regarding matching of the object with the desired item, and selectively notifying the consumer based on the determination.

In yet another aspect, the present disclosure is directed to a non-transitory computer readable medium containing computer-executable programmable instructions for performing a method for managing waste services by a service vehicle. The method may include capturing, during completion of a waste service activity by the service vehicle, an image of waste set out for retrieval by a consumer, and detecting a location of the service vehicle at a time of image capture. The method may also include receiving from the consumer at least one of a picture and a description of a desired item, recognizing an object in the image, making a determination regarding matching of the object with the desired item, and selectively providing the image and the location to the consumer based on the determination. The method may further include receiving from the consumer an acceptance or a rejection of the object in the image, and selectively disposing of the object or leaving the object for the consumer at its current location based on the acceptance or the rejection.

DETAILED DESCRIPTION

Figure 1:
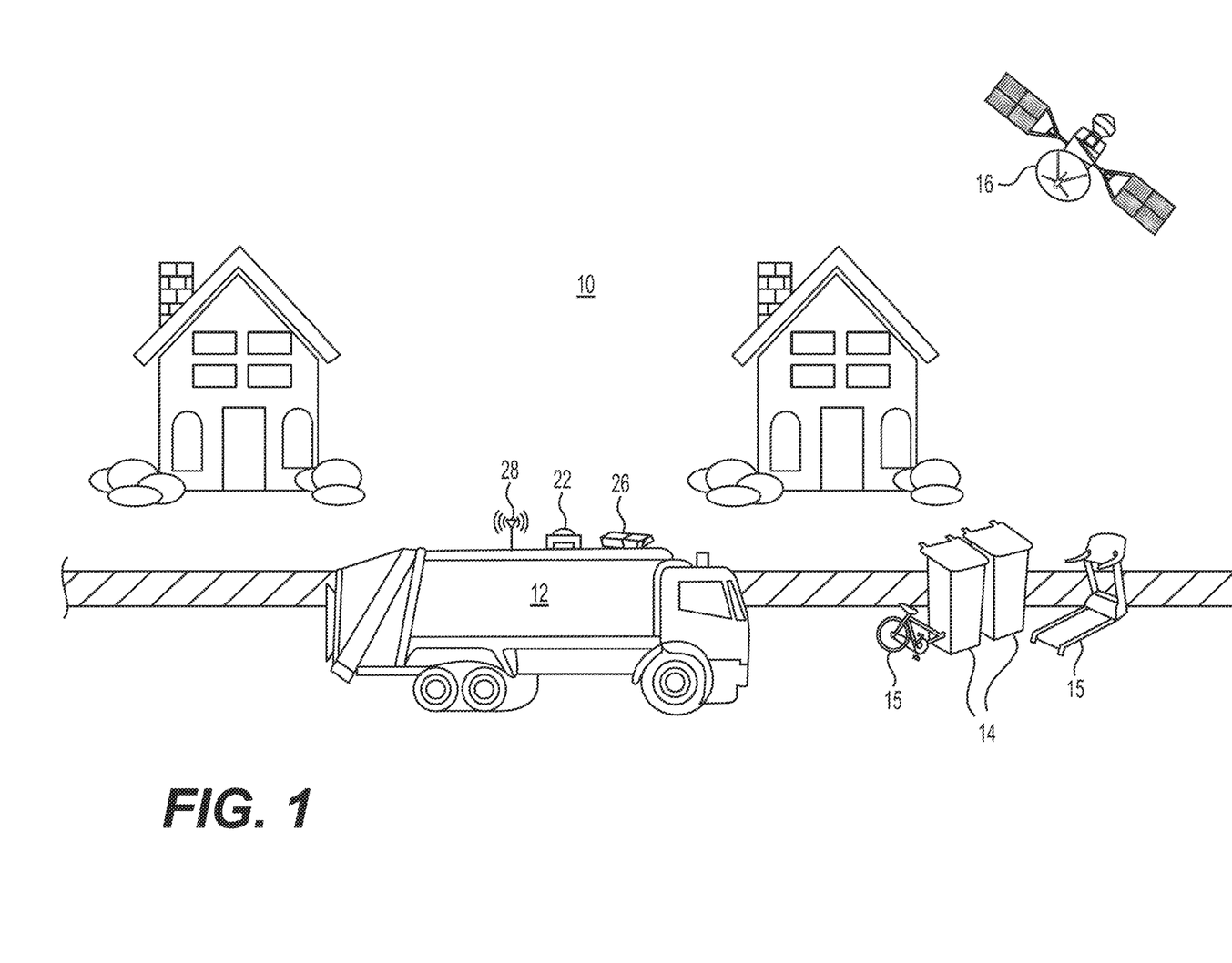
FIG. 1 is an isometric illustration of an exemplary waste management environment.

FIG. 1 illustrates an exemplary waste management environment ("environment") 10, at which one or more service vehicles 12 are providing waste services. Environment 10 may include any number of retail stores, factories, government buildings, residential addresses, or other locations that require the service of service vehicle 12. The service may include, for example, the removal of waste materials from inside of a receptacle 14, as well as the removal of waste (e.g., bulk items 15) not in receptacle 14 but still placed out by a customer for disposal.

Vehicle 12 may embody a haul truck (and/or a trailer that is attachable to the haul truck), which includes or otherwise carries a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch.

As each vehicle 12 moves about environment 10, a satellite 16 or other tracking device may communicate with an onboard controller 18 (shown only in FIG. 2) to monitor the movements of vehicle 12. As will be explained in more detail below, onboard controller 18 may facilitate management of service activities performed by vehicle 12 based on the tracked movements.

Figure 2:
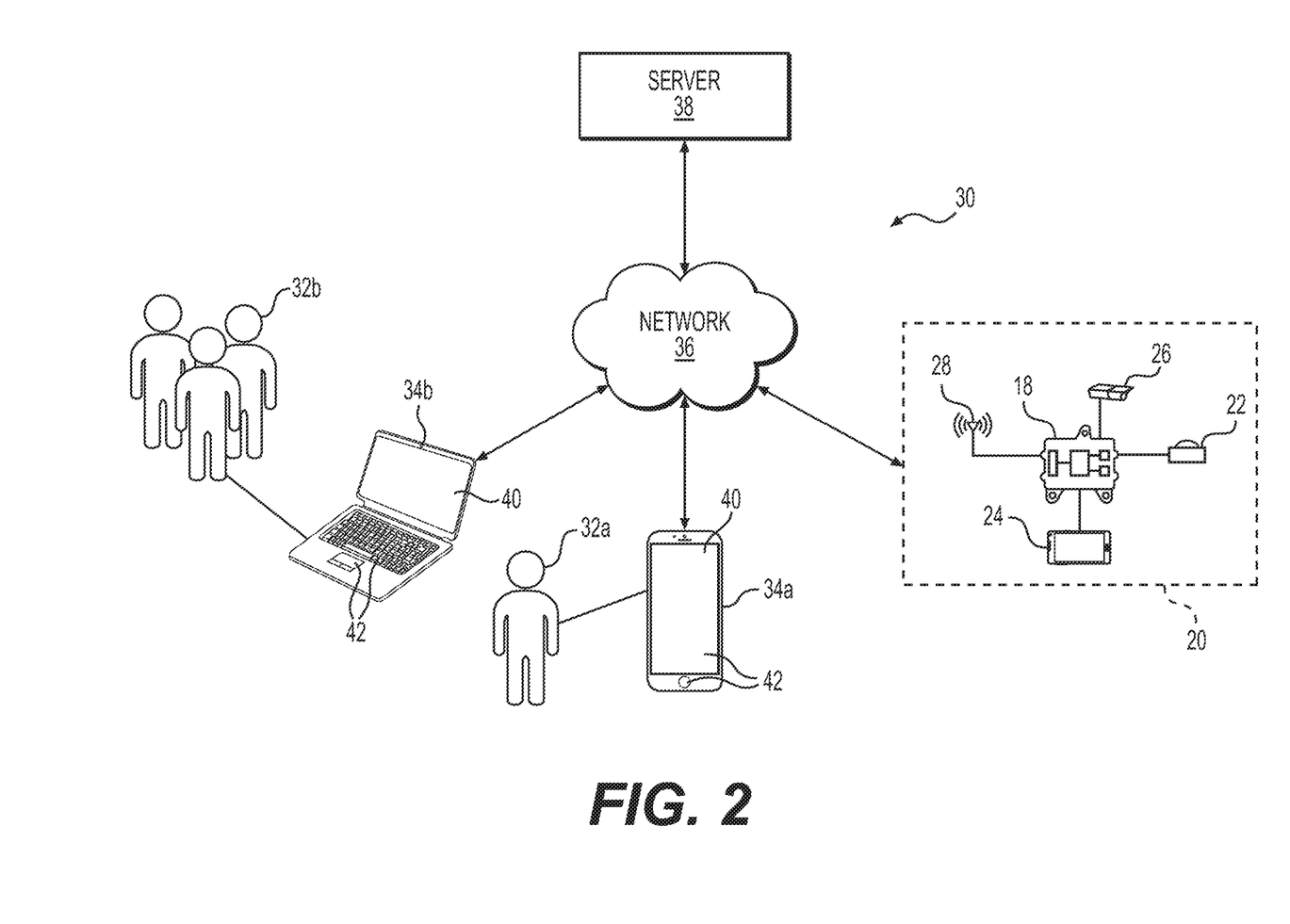
FIG. 2 is a diagrammatic illustration of an exemplary disclosed waste management system.

Onboard controller 18 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

As shown in FIG. 2, onboard controller 18 may form a portion of a waste tracking portal ("portal") 20. In addition to onboard controller 18, portal 20 may also include a locating device 22, a manual input device 24, at least one optical sensor (e.g., a camera) 26, and a communication device 28. Controller 18, sensor 26, and/or communication device 28 may be internal to manual input device 24, in some embodiments. Onboard controller 18 may be in communication with each of these other components and configured to determine, based on signals from the components and based on other known information stored in memory, the location of each service vehicle 12, as well as characteristics and locations of waste being moved by and/or in a vicinity of each service vehicle 12.

Locating device 22 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 22 may embody an electronic receiver configured to communicate with satellites 16 (referring to FIG. 1), or a local radio or laser transmitting system used to determine its relative geographical location. Locating device 22 may receive and analyze high-frequency, low-power radio or laser signals from multiple locations to triangulate a relative 3-D geographical position and orientation. This information may then be used by onboard controller 18 to update in an electronic map or database of environment 10 the locations and conditions of service vehicle(s) 12 and/or the associated waste encountered by vehicles 12.

Input device 24 may provide a way for an operator of service vehicle 12 to manually input information regarding observances made while traveling around environment 10. For example, the operator may be able to enter a type and/or condition of waste observed at a particular location, and or other information about the waste encountered by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In addition to receiving manual input from an operator, input device 24 may also be capable of displaying information, for example the electronic map of environment 10, instructions, scheduling, routing, receptacle information (e.g., ID, configuration, location, weight, etc.), payload information (e.g., weight and/or volume), etc.

Onboard controller 18 may be configured to manage communications between other onboard components (and, in some instances, between onboard and offboard components). For example, onboard controller 18 may receive signals from locating device 22 and input device(s) 24, and correlate the signals, filter the signals, buffer the signals, record the signals, or otherwise condition the signals.

FIG. 2 shows an exemplary waste management system ("system") 30, in which various implementations described herein may be practiced. System 30 represents, for example, a collaborative environment that allows remotely located participants 32 (e.g., a customer 32a or a general member of the public 32b) to engage in real-time recycling interactions via any number of separate consumer portals 34 (e.g., a first portal 34a and a second portal 34b) and waste tracking portal 20. Portals 20 and/or 34 may be connected to each other, for example, by way of a network 36 and a server 38. It is also contemplated that portals 20 and/or 34 could alternatively be connected to each other by way of a peer-to-peer connection, if available.

Each consumer portal 34 may be an electronic device having data entry, data transmission, and/or data display capabilities. In some embodiments, one or more of consumer portals 34 are mobile computing devices such as a smart phone, a tablet, a Personal Digital Assistant (PDAs), a laptop or notebook computer, or any combination of these devices. In other embodiments, one or more of consumer portals 34 is a stationary device such as a desktop computer. As shown in the exemplary component diagram of FIG. 3, consumer portal 34 may include a display 40, any number of input/output ("I/O") devices 42, one or more single- or multi-core processors 44, and a memory 46 having stored thereon one or more programs 48 and data 50.

Figure 3:
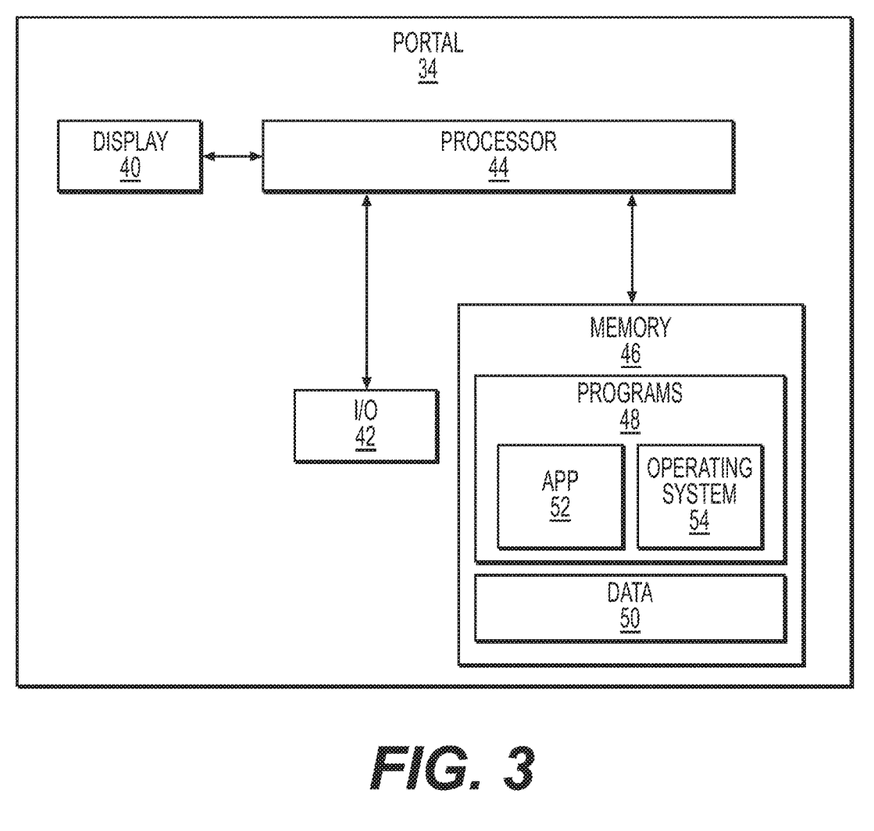
FIG. 3 is a diagrammatic illustration of an exemplary disclosed communication portal that may be used in conjunction with the waste management system of FIG. 2.

Display 40 may include a liquid crystal display (LCD), a light emitting diode (LED) screen, an organic light emitting diode (OLED) screen, and/or another known display device. Display 40 may be used for the rendering of video signals, graphics, and text under the control of processor 44.

I/O devices 42 may be configured to send and receive information. I/O devices 42 may include, for example, a keyboard, buttons, switches, a touchscreen panel (e.g., a panel integrated with display 40), and/or a speaker (e.g., a speaker integrated with display 40). I/O devices 42 may also include one or more communication modules (not shown) for sending information to and receiving information from other components of system 30 by, for example, establishing wired or wireless connectivity (e.g., via network 36) between portal 34a, portal 34b, portal 20, and server 38

Processor 44 can include one or more processing devices configured to perform functions of the disclosed methods. Processor 44 can constitute a single core or multiple core processors executing parallel processes simultaneously. For example, processor 44 can be a single core processor configured with virtual processing technologies. In certain embodiments, processor 44 uses logical processors to simultaneously execute and control multiple processes. Processor 44 can implement virtual machine technologies, or other known technologies to provide the ability to execute, control, run, manipulate, store, etc. multiple software processes, applications, programs, etc. In another embodiment, processor 44 includes a multiple-core processor arrangement (e.g., dual, quad core, etc.) configured to provide parallel processing functionalities to allow portal 34 to execute multiple processes simultaneously. As discussed in further detail below, processor 44 is specially configured with one or more applications and/or algorithms for performing method steps and functions of the disclosed embodiments. For example, processor 44 can be configured with hardware and/or software components that enable processor 44 to receive real-time video and/or location information from portal 20, record video, record location, receive control instructions regarding recycling of waste items, and selectively transmit to other connected portals 34 the recorded information and control instructions. It is appreciated that other types of processor arrangements could be implemented that provide for the capabilities disclosed herein.

Memory 46 may include a volatile or non-volatile, magnetic, semiconductor, tape, optical, removable, non-removable, or other type of storage device or tangible and/or non-transitory computer-readable medium that stores one or more executable programs 48, such as a recycling app 52 and data 50. Data 50 can include, for example, information that is personal to the operator of portal 34, account information, settings, and preferences.

In some embodiments, program 48 also includes an operating system 54 that performs known functions when executed by processor 44. By way of example, the operating system may include Microsoft Windows™, Unix™, Linux™, Apple™ operating systems, Personal Digital Assistant (PDA) type operating systems, such as Microsoft CE™, or another type of operating system. Portal 34 may also include communication software that, when executed by processor 44, provides communications with network 36 (referring to FIG. 2), such as Web browser software, tablet, or smart hand held device networking software, etc.

Recycling app 52 may cause portal 34 to perform processes related to generating, transmitting, storing, and receiving data in association with other participants of a recycling agreement. For example, recycling app 52 may be able to configure portal 34 to perform operations including: displaying a graphical user interface (GUI) for receiving recycling instructions and related information from the operator of portal 34; receiving video data associated with a recyclable item recognized by portal 20; receiving location data associated with the recyclable item; receiving instructions via I/O devices 42 and/or the user interface regarding timing and/or cost associated with recycling of the item; processing the control instructions, the video data, the location data, and the instructions; and communicating the instructions and data to another portal 34 and/or to portal 20 (e.g., directly via network 36 and server 38 or directly); receiving data and instructions from other portals 34 and/or portal 20; and arranging for electronic payment in association with confirmed delivery of the recyclable item.

Network 36 may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, the communication links may include non-proprietary links and protocols, or proprietary links and protocols based on known industry standards, such as J1939, RS-232, RP322, RS-422, RS-485, MODBUS, CAN, SAEJ1587, Bluetooth, the Internet, an intranet, 802.11 (b, g, n, ac, or ad), or any other communication links and/or protocols known in the art.

Server 38 may be a single server or a distributed system of multiple servers that cooperate to perform one or more of the processes and functionalities associated with the disclosed embodiments. For example, server 38 can include one or more desktop computers, workstations, handheld computing devices (smart phones or tablets), memory devices, and/or internal networks. As will be described in more detail below, server 38 may be configured to manage access between portal 20, different portals 34, and/or other resources on network 36.

Figure 4:
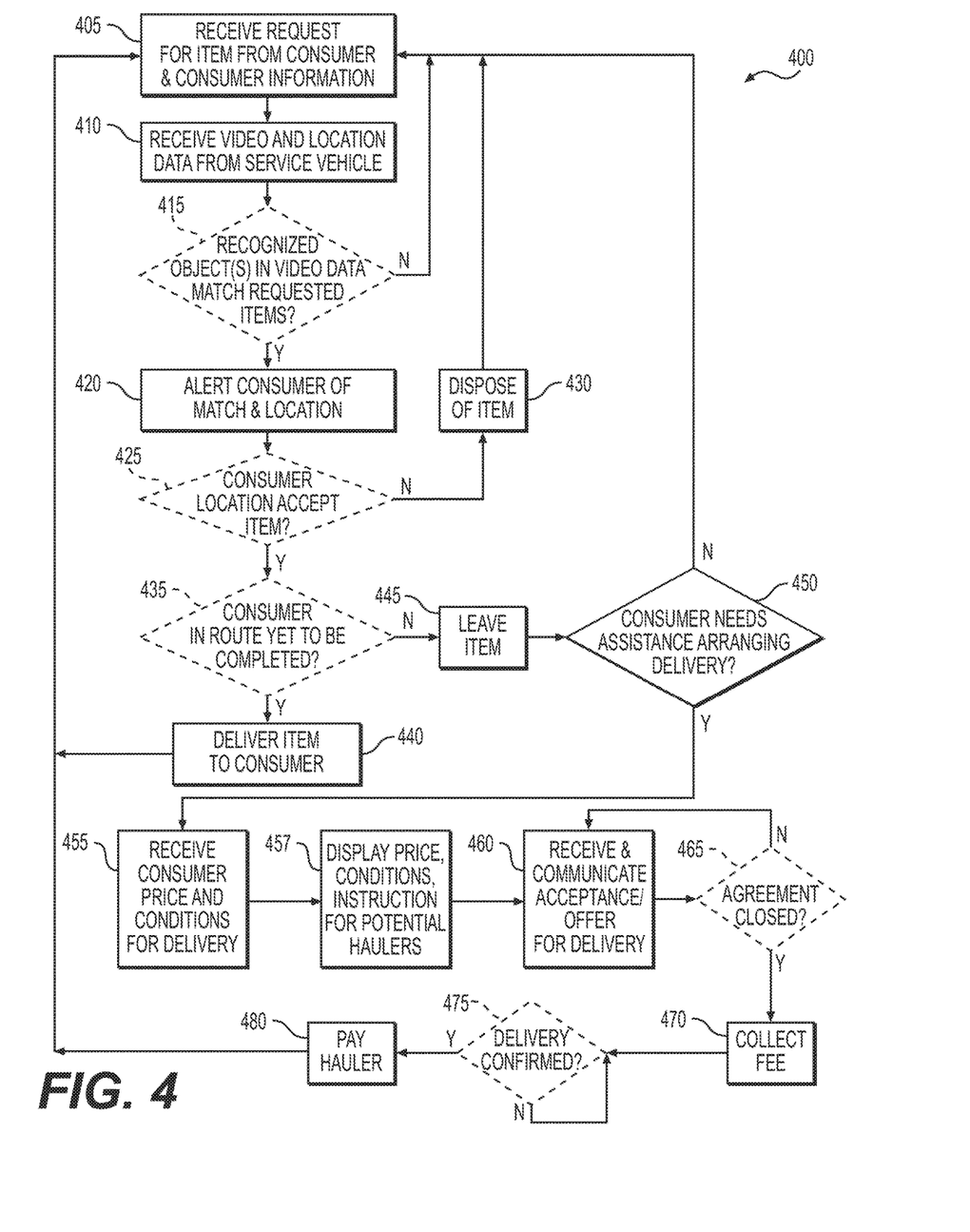
FIG. 4 is a flowchart of an exemplary disclosed method that may be implemented by the waste management system of FIG. 2.

FIG. 4 illustrates a flowchart of an exemplary method 400 for managing a recycling activity. Method 400 can be performed by the various devices disclosed above. For example, in some embodiments, method 400 is performed by each of portals 34, portal 20, and/or server 38. Method 400 will be explained in more detail below to further illustrate the disclosed concepts.

INDUSTRIAL APPLICABILITY

The disclosed system may be applicable to the waste service industry. In particular, the disclosed system, method, and app may provide a way for individual consumers of waste services to arrange with haulers and/or other consumers for reuse of discarded items (i.e., items left by one consumer for disposal by a hauler). For example, the disclosed system, method, and app may provide a way for a consumer to upload an image and/or a description of a desired item. The disclosed system, method, and app may also provide a way for a discarded item to be recognized and matched with a particular consumer that previously indicated the discarded item was desirable. The disclosed system, method, and app may further provide a way to arrange for delivery of the discarded item to the particular consumer and, in some instances, for electronic payment for the delivery. Operation of the disclosed system will now be described, with reference to FIG. 4.

Method 400 may be initiated by a consumer whenever the consumer desires a particular discarded item. In particular, in response to input from the consumer and under the direction of processor 44 of the corresponding portal 34 (e.g., portal 34*a* or portal 34*b*), a graphical user interface (GUI) associated with the disclosed app may be brought to the foreground of portal 34. Via the GUI, portal 34 may receive (e.g., via upload) a picture and/or description of a requested item (Step 405). The description may include, for example, a size of the item, a weight of the item, a condition or quality of the item, a proximity of the item, etc. In some instances, information (e.g., name, address, account number, telephone number, etc.) associated with the consumer may also be received via portal 34 (e.g., via I/O devices 42) at Step 405.

Portal 34 and/or server 38 may also receive video and/or location data from service vehicle 12 (e.g., via network 36 and portal 20—Step 410). This data may include, among other things, video images of waste that is encountered by service vehicle 12 during completion of an assigned route, as well as the location of service vehicle 12 at a time of encounter. For example, when a particular service vehicle 12 approaches a particular stop in its assigned route, sensor 26 may generate one or more images of the general location, for example images that include any bulk items 15 (e.g., a bicycle, a treadmill, etc.) that have been placed curbside for pickup by service vehicle 12. At this same time, locating device 22 may generate a location signal indicative of a location of service vehicle 12 at the time that the image is generated. The image and the location signal may be communicated offboard service vehicle 12 (e.g., via communication device 28), and stored within the memory of server 38 and/or portals 34.

The image(s) captured and stored at Step 410 may then be compared (e.g., by server 38 and/or portals 34) with the picture and/or description of the item requested at Step 405 to determine if any objects in the image(s) match the sought after items (Step 415). Any suitable object recognition software may be used for this purpose. If no objects within the image match the picture and/or description of the sought after items, control may return to Step 405.

However, when one or more objects recognized in the image captured at Step 410 substantially match (e.g., within a threshold margin) the picture and/or description received at Step 405, the consumer that provided the picture and/or description may be alerted of the match (Step 420). This alert may be an electronic notification, for example a text, an email, a call, and/or an alert provided via the disclosed app. In some instances, the image may be electronically delivered to the customer, as part of the notification. The consumer may then have the option to accept the matched item (Step 425). The consumer may accept the matched item in the same manner in which the consumer was notified. If the consumer does not accept the matched item (e.g., if the item is not the correct object, not in the desired condition, not the right color, too far away, etc.), the consumer may refuse the item. When this occurs, the item may be disposed of in the conventional manner (Step 430). For example, if the consumer does not respond to the match within a particular period of time (e.g., before service is complete at the match location, before service vehicle 12 has left the general area, etc.) or responds negatively, the item may be placed on or inside of service vehicle 12 and taken to an appropriate disposal location (e.g., to a landfill, a recycling center, a transfer station, etc.). In some embodiments, any time a match has been made, the item may be left curbside regardless of whether the consumer has accepted the item. This may allow the consumer more time to decide if the item is acceptable. If the item thereafter turns out to be unacceptable, the item may be disposed of during a subsequent service event.

Returning to Step 425, when the consumer determines that the matched item is acceptable, the location of the consumer may then be compared to a current location of service vehicle 12 and/or to an intended route of service vehicle 12 to determine if the consumer is near (e.g., within a threshold distance) or on the route (Step 435). When the consumer is near or on the route, the item may be loaded onto or inside of service vehicle 12 and delivered to the consumer (Step 440). Otherwise, the matched item may be left at its original location (Step 445). Control may return from Step 440 to Step 405.

In some embodiments, when a matched item is left at its original location, the disclosed app may be capable of assisting the consumer with arranging delivery of the item. In these embodiments, following Step 445, portal 34 and/or server 38 may determine if the consumer would like this assistance (Step 450). If no assistance arranging for delivery is desired, control may return to Step 405.

However, when it is determined at Step 450 that delivery arrangement assistance is desired, portal 34 and/or server 38 may receive (e.g., via the GUI of the disclosed app) price information and/or other delivery conditions or instructions from the consumer (Step 455). That is, the consumer may be able to specify how much the consumer is willing to pay for delivery of the matched item, as well as a desired delivery timeline, instructions regarding how and where to access to the matched item, the details (e.g., size, weight, and/or condition) about the matched item, and directions of how to reach the consumer location. In some embodiments, the consumer may also be able to select filtering operations associated with potential haulers. For example, the consumer may be able to indicate (e.g., via I/O devices 42) that the disposal service should be performed only by a hauler having a particular approval rating (e.g., four stars or greater). It is contemplated that, in some instances, the price information may not be provided and the consumer may thereby invite bids for completion of the delivery service.

After completion of Step 455, the disclosed app may allow for the picture, location, timeline, price, and other associated information/instructions to be shown on displays 40 of other portals 34 (Step 457). It is contemplated that this display of information may be generated only in response to a potential hauler requesting the information (e.g., when the potential hauler logs into a job board feature of the disclosed app), or that the display may be automatically shown to all potential haulers meeting a particular criteria (e.g., a geographical criteria, an availability criteria, a capability criteria, a price criteria, an approval rating criteria, etc.). The displayed information may be stored within a memory of server 38 and/or in a separate database (not shown). Additionally or alternatively, the displayed information may be communicated to and stored (e.g., within a library that is indexed based on a region, a date, a consumer, a hauler, a timeline, etc.) within the memories of the other portals 34, for example via network 36.

Any potential hauler (e.g., a previous consumer, a dedicated hauler, or a general member of the public) may utilize portal 34 (e.g., portal 34*b*) to accept and/or provide an offer for delivery services. For example, after viewing a listing of deliver jobs (e.g., via the disclosed app), a particular hauler may accept a particular job as offered by the consumer, or instead offer to provide the requested service under modified terms (e.g., for a different price, at a different time, in a different manner, etc.). Portal 34*b* may receive the acceptance/offer, and communicate the acceptance/offer to the corresponding consumer (Step 460). The consumer may then have the option to close the agreement (e.g., to form a contract, to accept or reject the offer, etc.).

Processor 44 (and/or server 38), via the disclosed app, may then determine when the agreement has been closed (Step 465), and then electronically collect the agreed-upon fee from the consumer (Step 470). This fee may not be immediately passed onto the contracted hauler, but instead held in escrow until after completion of the agreed-upon service has been confirmed. Processor 44 (and/or server 38), via the disclosed app, may determine that the disposal service has been completed (Step 475) in any number of different ways. For example, the consumer may provide an indication that the service was completed; and/or the hauler may provide proof (e.g., pictures, delivery receipt, GPS history information, etc.) that the service was completed. Portal 34 (and/or server 38) may receive this indication and/or proof, and then cause the previously collected fee to be electronically passed on to the hauler (Step 480).

The disclosed system, method, and app may provide many benefits. For example, any consumer may be able to participate in crowd-sourced recycling of bulk items 15 in a manner (e.g., time, location, condition, etc.) desired by the consumer. This may promote recycling and a cleaner environment, while also providing financial benefit for the consumer receiving the recycled item. In addition, employment opportunities may be provided to the local community, as anyone can be a potential hauler.

In the preceding description, various preferred embodiments have been described with reference to the accompanying drawings. It will, however, be evident that various modifications and changes may be made thereto, and additional embodiments may be implemented, without departing from the broader scope of the disclosure. The disclosure and drawings are accordingly to be regarded in an illustrative rather than restrictive sense. For example, advantageous results still could be achieved if steps of the disclosed techniques are performed in a different order or if components in the disclosed system were combined in a different manner or replaced or supplemented by other components. Therefore, it is intended that the disclosed embodiments and examples be considered as examples only.

What is claimed is:

1. A system for managing waste services performed by a service vehicle, comprising:
   a camera configured to capture, during completion of a waste service activity by the service vehicle, an image of waste set out for retrieval by a consumer;
   a portal; and
   a processor in communication with the camera and the portal, the processor being configured to execute instructions stored in memory to:

receive from the consumer via the portal at least one of a picture and a description of a desired item;
recognize an object in the image of waste captured by the camera;
determine whether the recognized object matches the desired item;
in response to determining that the recognized object matches the desired item, cause a notification to be displayed on the portal;
in response to the notification, receive, from the consumer via the portal, a message including an acceptance or a rejection of the recognized object; and
in response to the receipt of the message including the acceptance or the rejection of the recognized object, cause the service vehicle to perform one of:
loading, via a vehicle hatch of the service vehicle, the recognized object into the service vehicle; or
leaving the recognized object at its current location for the consumer.

2. The system of claim 1, further including a locating device configured to generate a location signal associated with the service vehicle at a time of the image capture, wherein the notification includes the location signal.

3. The system of claim 2, wherein the notification further includes the image of waste.

4. The system of claim 2, wherein the processor is further configured to execute the instructions to:
when the message includes the acceptance of the recognized object, determine, based on the location signal, if the consumer is located on a route of the service vehicle not yet serviced; and
in response to determining that the consumer is located on the route of the service vehicle not yet serviced, cause the service vehicle to perform the loading of the recognized object into the service vehicle and deliver the recognized object to the consumer.

5. The system of claim 4, wherein the processor is further configured to execute the instructions to cause the service vehicle to perform the leaving of the recognized object at its current location for the consumer when the consumer is not located on the route.

6. The system of claim 1, wherein:
the portal is a consumer portal;
the system further includes a hauler portal; and
the processor is further configured to execute the instructions to:
receive, from the consumer via the consumer portal, a request for assistance in arranging delivery of the recognized object to the consumer;
receive from the consumer, via the consumer portal, conditions associated with the delivery; and
cause the conditions associated with the delivery to be displayed on the hauler portal.

7. The system of claim 6, wherein the processor is further configured to execute the instructions to:
receive, via the hauler portal, at least one of an acceptance or an offer from a hauler to provide the delivery;
receive, via the consumer portal, electronic payment from the consumer for completion of the delivery; and
provide the electronic payment, via the hauler portal, to the hauler after confirmation of the completion of the delivery.

8. The system of claim 6, wherein the conditions associated with the delivery include at least one of a price that the consumer is willing to pay for the delivery of the recognized object, and a timing of the delivery.

9. A computer-implemented method for managing waste services performed by a service vehicle, comprising:
capturing, via a camera, during completion of a waste service activity by the service vehicle, an image of waste set out for retrieval by a consumer;
receiving from the consumer, at least one of a picture and a description of a desired item;
recognizing an object in the image of waste captured by the camera;
determining whether the recognized object matches the desired item;
in response to determining that the recognized object matches the desired item, displaying a notification to the consumer via a portal;
in response to the notification, receiving, from the consumer via the portal, a message including an acceptance or a rejection of the recognized object; and
in response to the receipt of the message including the acceptance or the rejection of the recognized object, causing the service vehicle to perform one of:
loading, via a vehicle hatch of the service vehicle, the recognized object into the service vehicle; or
leaving the recognized object at its current location for the consumer.

10. The method of claim 9, further including detecting a location of the service vehicle at a time of the image capture, wherein the notification includes the location.

11. The method of claim 10, wherein the notification further includes the image of waste.

12. The method of claim 10, further including:
when the message includes the acceptance of the recognized object, determining, based on the location, if the consumer is located on a route of the service vehicle not yet serviced; and
in response to determining that the consumer is located on the route of the service vehicle not yet serviced, causing the service vehicle to perform the loading of the recognized object into the service vehicle and deliver the recognized object to the consumer.

13. The method of claim 12, further including causing the service vehicle to perform the leaving of the recognized object at its current location for the consumer when the consumer is not located on the route.

14. The method of claim 9, further including:
receiving, from the consumer via the portal, a request for assistance in arranging delivery of the recognized object to the consumer and conditions associated with the delivery; and
displaying the conditions to a hauler.

15. The method of claim 14, further including:
receiving an acceptance or an offer from the hauler to provide the delivery;
receiving electronic payment from the consumer for completion of the delivery; and
providing the electronic payment to the hauler after confirmation of the completion of the delivery.

16. The method of claim 14, wherein the conditions associated with the delivery include at least one of a price that the consumer is willing to pay for the delivery of the recognized object, and a timing of the delivery.

17. A non-transitory computer-readable medium encoded with instructions, which when executed by a processor, cause the processor to perform a method for managing waste services by a service vehicle, comprising:
capturing, via a camera, during completion of a waste service activity by the service vehicle, an image of waste set out for retrieval by a consumer;

detecting a location of the service vehicle at a time of the image capture;

receiving from the consumer, at least one of a picture and a description of a desired item;

recognizing an object in the image of waste captured by the camera;

determining whether the recognized object matches the desired item;

in response to determining that the recognized object matches the desired item, providing a notification to the consumer via a portal, wherein the notification includes the image of waste and the location of the service vehicle;

in response to providing the notification, receiving, from the consumer via the portal, an acceptance or a rejection of the recognized object; and in response to the receipt of the acceptance or the rejection of the recognized object, causing the service vehicle to perform one of:
- loading, via a vehicle hatch of the service vehicle, the recognized object into the service vehicle; or
- leaving the recognized object at its current location for the consumer.

18. The non-transitory computer-readable medium of claim 17, wherein the method further includes:

when the acceptance of the recognized object is received, determining, based on the location, if the consumer is located on a route of the service vehicle not yet serviced;

in response to determining that the consumer is located on the route of the service vehicle not yet serviced, causing the service vehicle to perform the loading of the recognized object into the service vehicle and deliver the recognized object to the consumer; and in response to determining that the consumer is not located on the route of the service vehicle not yet serviced, causing the service vehicle to perform the leaving of the recognized object at its current location for the consumer.

19. The non-transitory computer-readable medium of claim 17, wherein the method further includes:

receiving, from the consumer via the portal, a request for assistance in arranging delivery of the recognized object to the consumer;

receiving, from the consumer via the portal, conditions associated with the delivery;

displaying the conditions associated with the delivery to a hauler;

receiving an acceptance or an offer from the hauler to provide the delivery;

receiving electronic payment from the consumer for completion of the delivery; and providing the electronic payment to the hauler after confirmation of the completion of the delivery.

\* \* \* \* \*